United States Patent
Oberland (10) Patent No.: US 7,269,351 B2
(45) Date of Patent: Sep. 11, 2007

(54) MULTI-CHANNEL OPTICAL LOADING CHANNEL TRANSMITTER

(75) Inventor: Richard Oberland, London (GB)

(73) Assignee: Alcatel, Paris (FR)

( * ) Notice: Subject to any disclaimer, the term of this patent is extended or adjusted under 35 U.S.C. 154(b) by 641 days.

(21) Appl. No.: 10/233,635

(22) Filed: Sep. 4, 2002

(65) Prior Publication Data

US 2003/0044111 A1 Mar. 6, 2003

(30) Foreign Application Priority Data

Sep. 5, 2001 (GB) ................................ 0121492.3

(51) Int. Cl.
*H04J 14/02* (2006.01)
*H04B 14/04* (2006.01)

(52) U.S. Cl. ........................................ 398/79; 398/182

(58) Field of Classification Search ................ 398/93, 398/201, 79, 85, 82, 92, 182; 372/29.011; 359/341.4, 341.1, 341.3
See application file for complete search history.

(56) References Cited

U.S. PATENT DOCUMENTS

| | | | |
|---|---|---|---|
| 5,101,291 A * | 3/1992 | Jopson | 398/79 |
| 5,153,933 A * | 10/1992 | Smith et al. | 385/27 |
| 5,221,983 A * | 6/1993 | Wagner | 398/72 |
| 5,274,659 A * | 12/1993 | Harvey et al. | 372/94 |
| 5,663,822 A | 9/1997 | Fee | |
| 5,822,476 A * | 10/1998 | Jopson | 385/27 |
| 6,163,553 A * | 12/2000 | Pfeiffer | 372/6 |
| 6,256,328 B1 | 7/2001 | Delfyett et al. | |
| 6,388,806 B1 * | 5/2002 | Freeman et al. | 359/341.3 |
| 6,603,822 B2 * | 8/2003 | Brede et al. | 375/340 |
| 6,704,511 B1 * | 3/2004 | Kerfoot et al. | 398/85 |

FOREIGN PATENT DOCUMENTS

| | | |
|---|---|---|
| EP | 0829979 A2 | 3/1998 |
| EP | 0829981 A2 | 3/1998 |
| EP | 0994583 A1 | 4/2000 |
| EP | 1024541 A2 | 8/2000 |

OTHER PUBLICATIONS

Coppin, P., Hodgkinson, T.G. "Novel Optical Frequency Comb Synthesis Using Optical Feedback." IEEE, Electronics Letters. vol. 26, Issue 1, Jan. 4, 1990. p. 28-30.*

* cited by examiner

*Primary Examiner*—Jason Chan
*Assistant Examiner*—Quan-Zhen Wang
(74) *Attorney, Agent, or Firm*—Sughrue Mion, PLLC (57) ABSTRACT

A wavelength division multiplexing optical transmission system, an optical loading-channel transmitters, a WDM optical transmitter and a method of optically loading an optical transmission line with multiple optical loading channels. The multiple optical loading channels are produced in the form of an optical comb by using a periodic optical filtering apparatus incorporated within a resonator constructed as an optical loop. A plurality of optical loading channels of the generated optical comb are then output without data being modulated thereon.

13 Claims, 3 Drawing Sheets

FIG_1

FIG_2

FIG_4

FIG_3

FIG_5

MULTI-CHANNEL OPTICAL LOADING CHANNEL TRANSMITTER

The present invention related to a multi-channel optical loading transmitter for providing optical loading channels in an optical transmission line, and in particular in an optical transmission line for carrying wavelength division multiplexed optical signal channels.

Wavelength division multiplexing (WDM) is widely regarded as the preferred technique of increasing the data transmission capacity of an optical telecommunications transmission system. According to this technique, optical transmission systems are designed to be able to provide multiple separate and distinct optical data transmission channels (WDM data channels), divided in wavelength, for simultaneous multiplexed transmission along a given one transmission line of the system.

In many fibre-optic transmission lines, optical fibre amplifiers (e.g. Erbium-doped fibre amplifiers) are placed within the line at spaced locations along the length of the line. This is done to counter the optical attenuation suffered by WDM data channels in the course of traversing the transmission line. As is well known, such fibre amplifiers have a gain spectrum within which the wavelength of each WDM channels must reside if it is to receive amplification.

Current WDM transmitters typically employ WDM channel sources capable of simultaneously producing several tens of optical WDM data channels. However, when operating at less than full capacity, and particularly when operating at low capacity, such WDM transmitter may in fact launch only a few WDM data channels into a transmission line. In such a situation, those few WDM channels tend to cause "spectral hole-burning" within the gain spectrum of the optical amplifiers of the transmission line, especially when channel powers are high and channel spacing is large. This results from saturation in the gain medium (e.g. Erbium-doped fibre) of the fibre amplifiers at the wavelengths of the few WDM channels present, causing a local reduction (a "hole") to form in the gain spectrum at those wavelengths. This inhomogeneity in gain is highly undesirable.

Often, optical WDM transmitters are not operated at their full WDM data channel carrying capacity and, to reduce spectral hole-burning, it has been found desirable to "load" the transmission line with additional redundant non-data WDM channels, known as "loading channels", located at wavelengths spread across the gain spectrum of the optical fibre amplifiers within the transmission line. Having a spread of several tens of WDM optical channels (whether data-carrying channels or "loading" channels) has been found to reduce the inhomogeneous effects of spectral hole-burning. This being due in part to the lower channel powers present in each channel when loading channels are used (the same total power is shared across between the channels).

A data-carrying WDM channel is generally required to have a well-defined and stable wavelength, a narrow linewidth, and a single polarisation in order to function efficiently as a data carrier (linear polarisation is also often necessary in order that external modulation can be performed, such as in a Lithium Niobate optical modulator). However, these optical properties come at the cost of inducing various unwanted non-linear optical penalties such as stimulated Brillouin scattering (SBS), four-wave mixing and the like. Consequently, after modulation, it is typical to de-polarise the data channels in an attempt to reduce polarisation hole-burning and other polarisation-dependent losses in the line fibre.

Distributed feed-back (DFB) lasers are known to provide optical outputs having some of the properties required of data-carrying channels and, accordingly, WDM optical transmitters currently employ an array of DFB lasers as WDM data-channel sources, one laser for each data channel. However, each DFB laser typically requires complex control circuitry to control the temperature and drive current required to maintain the wavelength and narrow linewidth thereof.

DFB lasers from the same array are also used to provide optical loading channels when required. Since optical loading channels do not require the same optical properties (above) as data-carrying channels do, they must be modified in such a way that mitigates the non-linear penalties associated with those properties. For example, the narrow linewidth of DFB lasers typically induces SBS in the WDM data channels. Complex and expensive circuitry is required to "dither" the output wavelength of the DFB lasers used in optical loading in order to effectively broaden their linewidth and reduce SBS. De-polarisation (as mentioned above) is also often required.

Clearly, the characteristics desirable in a data-carrying WDM optical channel source are most undesirable in a non-data carrying loading channel, and vice versa. In using as loading channel sources DFB lasers chosen for their suitability as data-channel sources, the prior art incurs the problem of having to modify those same lasers to make them suitable as loading channel sources. Furthermore, DFB lasers are not only expensive, but are bulky and consume a relatively large quantity of power in operation.

It is an aim of the present invention to overcome this deficiency in the prior art at least.

At its most general, the present invention proposes to employ a doped-fibre laser (e.g. an Erbium-doped optical fibre laser) incorporating a periodic optical filtering apparatus, to generate an optical comb comprising a plurality of optical channels for use in wavelength division multiplexed (WDM) optical transmission without data being modulated thereon.

In this way, the present invention obviates the need to use one dedicated DFB laser per loading channel and the associated cost and complexity of their implementation. Rather, one laser source is used to simultaneously generate a plurality of separate optical loading channels.

Furthermore, in using an optical fibre laser the present invention is able to produce a de-polarised optical loading channels, since the random polarisation of the many cavity modes of the fibre laser lead to an optical output effectively having random polarisation. Thus, the undesirable effect of polarisation-dependent losses and four-wave mixing suffered by the strongly polarised optical loading channels output from a DFB laser will tend to be less prevalent in loading channels output from a loading channel source according to the present invention.

The optical fibre laser of the present invention may produce optical channels having a relatively broad spectral linewidth (relative to DFB lasers). This removes the need to employ the complex frequency dithering techniques associated with the production of loading channels with a DFB laser, which are required to reduce the undesirable effects of stimulated Brillouin scattering within those channels.

Since the present invention proposes to simultaneously generate some, if not all, of the loading channels of an optical transmission system with the same one optical source, the relative wavelength spacing of those channels is inherently set by that one optical source. There is no need to employ costly and complex apparatus and techniques to maintain that relative spacing as is the case when a plurality of independent DFB lasers are employed to separately generate individual loading channels.

In a first of its aspects, the present invention may provide a multi-channel optical loading-channel transmitter comprising a doped-fibre laser, a periodic optical filtering apparatus for generating an optical comb comprising a plurality of separate optical channels from amplified optical radiation produced by the optical fibre laser, and output apparatus for outputting from the optical loading-channel source a plurality of optical loading channels being at least some of said optical channels of the generated optical comb.

Thus, use of the periodic optical filtering apparatus in conjunction with the optical fibre laser serves to generate an output from the laser comprising a string of loading channels for use in optically loading a WDM or DWDM optical transmission line or the like.

In a second of its aspects, the present invention may provide a wavelength division multiplexing optical transmission system comprising: one or more optical data transmitters each for generating a single modulated optical data channel; and one or more optical loading-channel transmitters each for generating a plurality of un-modulated optical loading channels, wherein each optical loading channel transmitter comprises a doped-fibre laser, a periodic optical filtering apparatus for generating an optical comb comprising a plurality of separate optical channels from amplified optical radiation produced by the optical fibre laser, and output apparatus for outputting from the optical loading-channel transmitter said plurality of un-modulated optical loading channels being at least some of said optical channels of the generated optical comb.

Thus, the present invention may permit the optical loading channels of a WDM optical transmitter to be provided by one or more dedicated loading channel sources, each providing a plurality of loading channels.

Consequently, in a third of its aspects, the present invention may provide for the use in a wavelength division multiplexing optical transmission system of one or more optical loading-channel transmitters each for generating a plurality of un-modulated optical loading channels, wherein each optical loading channel transmitter comprises a doped-fibre laser, a periodic optical filtering apparatus for generating an optical comb comprising a plurality of separate optical channels from amplified optical radiation produced by the optical fibre laser, and output apparatus for outputting from the optical loading-channel transmitter said plurality of un-modulated optical loading channels being at least some of said optical channels of the generated optical comb.

In this way, the broad-band spectral bandwidth over which the doped-fibre laser emits enables a plurality of separate loading channels to be generated simultaneously by each one of the one or more optical loading-channel transmitters. Of course, this is distinct from narrow-band optical data-channel transmitters dedicated to emitting a single, modulated optical data channel within a narrow spectral bandwidth.

Thus, in a fourth of its aspects, the present invention may provide a WDM optical transmitter comprising: one or more narrow-band optical sources each having a narrow spectral bandwidth and each generating a single optical channel within said narrow spectral bandwidth; and one or more broad-band optical sources each having a spectral bandwidth broader than the spectral bandwidth of any one of said narrow-band optical sources, wherein each broad-band optical source comprises a periodic optical filtering apparatus for generating an optical comb comprising a plurality of separate optical loading channels.

In a fifth of its aspects, the present invention may provide a method of optically loading an optical transmission line with multiple optical loading channels comprising the steps of: generating laser radiation with a doped-fibre laser, generating an optical comb comprising a plurality of separate optical loading channels from amplified optical radiation produced by the optical fibre laser, and outputting a plurality of the optical loading channels without any data modulation into the optical transmission line carrying modulated optical data channels.

According to any of its above aspects, the present invention may also provide the following features.

The periodic optical filtering apparatus may comprise a Fabry-Perot optical filter through which the output of the doped-fibre laser is passed so as to generate therefrom an optical comb of loading channels. Alternatively, the periodic optical filtering apparatus may comprise one or more optical interleavers through which the output of the doped-fibre laser is passed so as to generate therefrom an optical comb of loading channels.

It will be appreciated that the amplifying medium of the optical fibre laser employed in the present invention may be any rare-earth-doped optical fibre such as an Erbium-doped optical fibre, or a neodymium-doped fibre, or a fibre having a fibre doped with other rare-earth elements. It will also be appreciated that the optical fibre laser possesses a source of pump radiation.

The doped-fibre laser may possess optical feedback apparatus for providing an optical feedback path including at least one rare-earth-doped optical fibre, with the periodic optical filtering apparatus located within the optical feedback path such that amplified optical radiation output from the doped-fibre passes through the periodic optical filtering apparatus before being directed back into the rare-earth-doped fibre.

Thus, the optical feedback apparatus provides an optical cavity for the optical fibre laser. The optical feedback apparatus may be a closed optical loop in which at least one rare-earth-doped fibre is located in series with the periodic optical filtering apparatus. In this instance, the optical cavity provided by the optical feedback apparatus defines a ring laser within the optical loop of which the periodic optical filtering apparatus is located. The periodic optical filtering apparatus of the loop may comprise one or more Fabry-Perot optical filters, or one or more optical interleavers, and the optical loop may be provided by an optical fibre.

Where the optical filtering apparatus comprises one or more optical interleavers, the optical cavity provided by the optical feedback apparatus may include a reflecting element that provides other than a close optical loop, but which reflects radiation output from the rare-earth-dope fibre back into that fibre via the one or more interleavers. In such a case the optical fibre laser defined thereby (i.e. optical fibre gain medium plus optical cavity) may be configured as to permit the laser to operate below lasing threshold (i.e. by inhibiting cavity resonance) while providing amplified radiation. In other cases, it may be configured to resonate above lasing threshold as shall be described in more detail below.

Each interleaver of the loading-channel source may be an optical device having three optical transmission ports in which, the transmission characteristic between a first and a second of the optical ports has the form of a first series of spaced wavelength channels, and the transmission characteristic between the first and a third of the optical ports has the form of a second series of spaced wavelength channels, and the wavelength positions of the first series interleaves the wavelength positions of the second series. The first series may be transmitted in any direction between the first and second ports of an interleaver, while the second series may be transmitted in any direction between the first and third ports.

The optical loop of the feedback apparatus may further include a frequency shifting apparatus (e.g. an acousto-optical frequency shifter) which shifts by a predetermined amount the frequency position of the loading channels of optical combs which pass through it from the periodic optical filter of the loop. This frequency shifting (by a small amount e.g 10 MHz) aims to ensure that the action of the ring laser defined by the optical loop does not "lock-on" to any one loading channel of the optical comb and progressively amplify and narrow that one channel to the exclusion of all others, as ring lasers are prone to do. Thus, the frequency-shifting apparatus aims to maintain an even distribution of intensity across the channels of the optical comb circulating around the optical loop of the circulating means.

Thus, the doped-fibre laser may comprise a resonator constructed as a loop including: at least one rare-earth-doped optical fibre; said periodic optical filtering apparatus; and frequency shifting apparatus operable to shift by a predetermined amount the frequency position of the loading channels of optical combs which pass through it; such that amplified optical radiation output from said at least one rare-earth-doped optical fibre passes through said periodic optical filtering apparatus and said frequency shifting apparatus before being directed back into said at least one rare-earth-doped optical fibre.

The optical fibre laser preferably comprises a source of optical pump radiation optically coupled to one end of the rare-earth-doped optical fibre so as to direct pump radiation into that fibre in one direction. Preferably, the optical loop of the optical feedback apparatus has a pump recycling apparatus comprising, an optical transmission line a first end of which is coupled to the optical loop for removing residual pump radiation therefrom and a second end of which is coupled to the optical loop for inputting removed pump radiation thereto, and a rare-earth-doped optical fibre located within the optical loop for receiving removed pump radiation input thereto by the second end of the transmission line of the recycling apparatus.

Thus, unused pump radiation output from the rare-earth-doped fibre of the laser may be redirected to another rare-eath-doped fibre for the purposes of pumping that other doped fibre. In this way the pump recycling apparatus makes efficient use of available pump radiation and enhances the efficiency of the loading channel source.

Preferably, the first end of the recycling apparatus is coupled to the optical loop of the feedback apparatus proximate to an end of the rare-earth-doped fibre of the laser via a wavelength-selective optical coupler which removes pump radiation from the optical loop but does not remove amplified radiation therefrom. Preferably, the second end of the recycling apparatus is coupled to the optical loop of the feedback apparatus via an optical circulator located within the optical loop, the optical circulator being configured to direct removed pump radiation from the optical transmission line into the other rare-earth-doped fibre.

More preferably, the optical circulator is also configured to direct unused pump radiation output from the other rare-earth-doped fibre into the optical transmission line of the recycling loop for subsequent input into the rare-earth-doped fibre of the laser via the optical coupler located at the first end of the optical transmission line of the recycling apparatus.

As mentioned above, the periodic optical filtering apparatus of the optical loop of the optical feedback apparatus may comprise at least a first optical interleaver having a first optical port located within the optical loop for receiving and de-interleaving into two distinct optical combs amplified optical radiation input thereto from the rare-earth-doped fibre of the laser, and a second optical port connected to the remainder of the optical loop for outputting one of those two optical combs.

Thus, the optical interleaver forms an optical comb from the amplified radiation produced by the laser by separating that amplified radiation into two distinct combs, and removing one comb from the optical loop while circulating the other comb as feedback along the optical feedback loop of the ring laser. The removed optical comb is output from the interleaver at a third optical port of the interleaver.

It is preferable that, in addition to the aforementioned optical feedback loop, the feedback apparatus includes a reflecting element arranged to reflect back into the third optical port of the interleaver removed optical comb radiation output therefrom such that the reflected radiation passes through the interleaver and is directed back into the rare-earth-fibre of the laser via the first optical port of the interleaver.

In this arrangement, the interleaver directs the first optical comb around the optical feedback loop of the feedback apparatus, while directing the removed optical comb to the reflective element of the feedback apparatus. Thus, the loop of the feedback apparatus feeds back first optical comb radiation into the rare-earth-doped fibre of the laser, while the reflecting element of the feedback apparatus feeds back removed optical comb radiation thereto. Preferably, according to this arrangement, the resulting ring laser is to be operated above its lasing threshold using first comb radiation circulating within the feedback loop, while removed, reflected and fed-back optical comb radiation is subsequently removed from the laser loop as output for use as loading channels.

In this way, the optical interleaver may serve not only as a periodic filter for producing an optical comb for loading channel use, but may also act as filter for ensuring that the laser resonates at a frequency other than that of any of the loading channels. That is to say, the laser is caused to resonate only at those frequencies permitted by the interleaver e.g. frequencies residing within the bandwidth of a channel of the first comb, but not of a channel of the other comb. This prevents the laser "locking-on" to a loading channel frequency during resonance, and helps maintain a generally even distribution of power across the output loading channel optical combs which are derived from Amplified Spontaneous Emissions (ASE) output from the doped fibre in this arrangement. In other arrangements according to the present invention, the output loading channel optical combs may be other than ASE.

Preferably, when the periodic optical filtering apparatus comprises an optical interleaver, the optical feedback loop includes a variable optical attenuator for varying the optical attenuation incurred by optical radiation circulating within the loop and through the interleaver.

The output power of the loading channels may preferably be controlled by controlling the degree of optical attenuation of first optical comb radiation circulating within the optical feedback loop, and/or controlling the pump radiation power level of the laser.

Preferably, the invention according to any of its aspects comprises a band-pass filter placed within the optical loop of the optical feedback apparatus for filtering amplified optical radiation circulating within the optical loop. Preferably, the band-pass filter removes/attenuates optical radiation at least at and around 1532 nm, at which wavelength Erbium-doped fibres tend to possess an unstable gain peak.

The invention according to any of its aspects may also comprise a gain-flattening filter placed within the optical loop of the optical feedback apparatus for gain-flattening optical comb radiation circulating within the optical loop.

The output apparatus preferably comprises a second optical interleaver connected at a first optical port thereof to an end of the rare-earth-doped fibre remote from the first optical interleaver, and at a second optical port thereof to the optical feedback loop, the second interleaver being arranged to receive via the doped fibre reflected optical comb radiation output from the first optical interleaver, to output the reflected optical comb radiation at a third optical port thereof, to receive at the second optical port thereof optical comb radiation circulating within the feedback loop, and to output that circulating radiation at the first optical port thereof for input into the doped fibre connected thereto. Hence, the second optical interleaver is provided to remove from the loop of the laser the reflected fed-back comb radiation emanating from the doped fibre, while directing the first optical comb radiation around the feedback loop.

Alternatively, the output apparatus may comprise an optical coupler coupled to the optical loop of the feedback apparatus, for removing a predetermined portion of the amplified radiation circulating therein. This is preferable when the loading channel comb is derived from resonating laser radiation as opposed to ASE. The optical coupler may be a 3 dB optical coupler for removing substantially half of the amplified radiation within the optical loop. The output apparatus may further comprise a gain-flattening filter for gain-flattening optical radiation removed thereby.

A different optical feedback apparatus, without a closed feedback loop, may be employed according to any aspect of the present invention. Accordingly, the optical feedback apparatus may comprise a first optical interleaver connected to a first end of the rare-earth-doped fibre of the laser for de-interleaving into a first optical comb and a second optical comb amplified optical radiation input thereto from the rare-earth-doped fibre and for outputting those two optical combs, and a first reflecting element for reflecting back into the first optical interleaver the first optical comb such that the reflected first optical comb passes through the first optical interleaver and back into the first end of the rare-earth-doped fibre.

Thus, the result of the optical feedback apparatus is that the reflected first optical comb produced by the de-interleaving function of the first optical interleaver is subsequently amplified by the rare-earth-doped optical fibre as it passes therethough, and is output by the output apparatus thereof.

In this way, the first reflecting element of the feedback apparatus effectively defines an optical cavity for the optical fibre laser, with the interleaver being located within that optical cavity and serving the function of periodic optical filtering apparatus.

The output apparatus may comprise a second optical interleaver connected to a second end of the rare-earth-doped fibre remote from the first optical interleaver, the second interleaver being arranged to receive the amplified reflected first optical comb output from the second end of rare-earth-doped fibre and to output that optical comb at one optical output of the second interleaver.

The optical feedback apparatus may include the aforementioned second optical interleaver connected to the second end of the rare-earth-doped fibre for de-interleaving into the aforementioned first optical comb and second optical comb amplified optical radiation input thereto from the rare-earth-doped fibre and for outputting those two optical combs, and a second reflecting element for reflecting back into the second optical interleaver the second output optical comb such that the reflected second optical comb passes through the second optical interleaver and back into the second end of the rare-earth-doped fibre.

In this way, the optical feedback apparatus ensures that the first and second reflected optical combs produced by the de-interleaving function of the first and second optical interleavers respectively are subsequently amplified by the rare-earth-doped optical fibre each passes therethough, and is output by the output apparatus thereof.

Thus, the combination of the first reflecting element and the second reflecting element of the feedback apparatus effectively defines an optical cavity for the optical fibre laser, with the first and second interleavers being located within that optical cavity and collectively serving the function of periodic optical filtering apparatus.

In this instance the output apparatus may comprise both the first optical interleaver and the second optical interleaver, the first interleaver being arranged to receive the amplified reflected second optical comb output form the first end of the rare-earth-doped fibre, and the second interleaver being arranged to receive the amplified reflected first optical comb output from the second end of rare-earth-doped fibre, and each of the aforementioned optical interleavers is arranged to output at one optical output thereof the respective received reflected optical comb.

Thus, in such an arrangement, each of the first and second interleavers is able to generate a first optical comb for output to an associated reflecting element, and a second optical comb for direct output from the loading channel apparatus. The first and second optical interleavers produce the same two optical combs from amplified optical radiation input thereto from the rare-earth-doped fibre, and consequently each one of the two interleavers is able to permit an optical comb generated by the other interleaver to pass through it unchanged. This permits each one of the first and second interleavers to act as part of the output apparatus for the other.

The laser possessing either the first or both the first and second interleavers, is preferably operated at a power level below lasing/resonance threshold so as to prevent the laser "locking-on" to a particular loading channel frequency (causing it to be amplified preferentially). Rather, loading channel radiation is derived from broadband ASE emanating from the (pumped) doped fibre of the laser, this ASE being formed, by the action of the interleaver(s), into distinct optical combs of loading channels having similar (or preferably equal) optical power.

The optical output apparatus may comprise one or more additional optical interleavers for further separating (i.e. de-interleaving) into sub-combs the optical combs output from one or more of the interleaver(s) of the periodic optical filtering apparatus. Preferably, these additional interleavers are connected in a cascade arrangement cascading from the optical interleavers of the periodic optical filtering apparatus.

Alternatively, or additionally, the optical output apparatus may comprise one or more additional optical interleavers for further combining (i.e. interleaving) the optical combs output from interleaver(s) of the periodic optical filtering apparatus. The optical output apparatus may include one or more gain flattening filters connected to the outputs of the terminal optical interleaver(s) of the output apparatus.

The output apparatus may include one or more optical isolators for preventing external radiation entering the laser and destabilising it.

It has been found that the additional interleaving (or de-interleaving) performed by the optical output apparatus tends to produce a narrowing of the bandwidth of each loading channel of an optical comb input thereto. Consequently, the loading channels of those combs tend to become narrower and more well defined. In particular, it is advantageous to produce loading channels each having a bandwidth comparable/similar (preferably the same as) the bandwidth of single data channels (e.g. approx. 20 GHz) with which the loading channels are to be transmitted in use. This property helps reduce the occurrence of "cross-talk" between data and loading channels, the presence of which would be to the detriment of data channels.

The output apparatus may include loading-channel selection apparatus, such as one or more band-pass filters, for selecting for output a predetermined set of the loading channels of an optical comb.

There now follow non-limiting examples of the present invention, reference being made to the following drawings.

Figure 1:
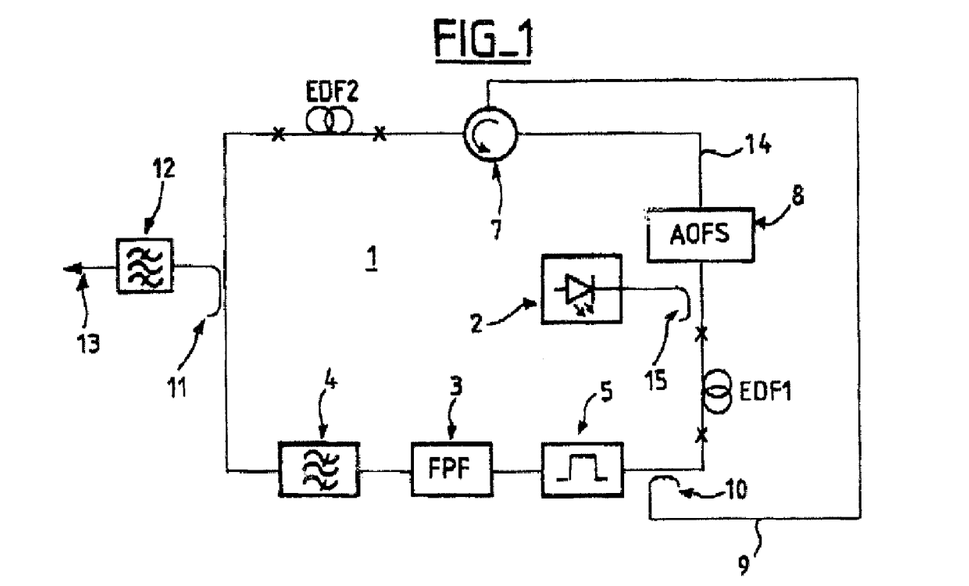
FIG. 1 illustrates a multi-wavelength optical loading-channel source having an optical feedback loop including a Fabry-Perot filter, an acousto-optical frequency shifter and a pump-radiation recycling loop.

Referring to FIG. 1 there is illustrated a multi-wavelength optical loading-channel source 1 in the form of an optical fibre ring laser. The optical fibre ring laser comprises an optical fibre feedback loop 14 defining the resonating cavity of the ring laser. The feedback loop 14 includes a first Erbium-doped optical fibre EDF1 forming part of the loop, and a pump laser 2 coupled to the loop 14 via a wavelength selective optical coupler 15 located at one end of the first Erbium-doped fibre EDF1 so as to direct pump radiation into that fibre. The wavelength selectivity of the optical coupler 15 is such that amplified radiation generated by the lasing action of the first Erbium-doped fibre is not removed from the fibre loop 14 by the optical coupler 15 of the pump laser.

An input end of a pump recycling loop 9 is coupled to the feedback loop 14 via wavelength-selective optical coupler 10, which is operable to remove unused pump radiation, but not amplified radiation, emanating from EDF1. The removed unused pump radiation is coupled back into the feedback loop 14 via optical circulator 7 which directs that radiation into a second Erbium-doped fibre EDF2 for the purposes of pumping that fibre.

Subsequent to the optical coupler 10 within the pump recycling loop 9, the feedback loop 14 contains a bandpass filter 5 having a uniform wavelength pass-band extending from above 1532 nm up to about 1560 nm. This defines the range of the optical loading channels produced by the ring laser, and removes radiation at the unstable 1532 nm Erbium gain peak.

The fibre loop 14 also contains a Fabry-Perot periodic optical filter (FPF) 3, to which the band pass filter is connected, followed by a gain-flattening filter 4 having a wavelength-dependent loss which is inverse to and compensating for the gain profile of the optical comb output from the Fabry-Perot filter 3.

An output apparatus follows the gain-flattening filter 4 in the feedback loop 14. This apparatus comprises the 3 dB optical coupler 11 coupled to the feedback loop 14 so as to remove substantially half of any filtered amplified optical radiation output from the band-pass filter 4 of the loop, and to direct that removed portion of radiation towards the output port 13 of the loading-channel source 1 via a gain-flattening filter 12. An acousto-optical frequency shifter (AOFS) 8 is located adjacent the first Erbium-doped fibre EDF1, in the subsequent limb of the feedback loop 14. This completes the feedback loop of the ring laser.

In operation, pump radiation generated by the pump source 2 (e.g. wavelength=1480 nm) is directed into the Erbium-doped fibre EDF1 of the ring laser by the pump coupler 15. Optical pumping of the Erbium atoms of the doped fibre ensues. Subsequently, numbers of those pumped atoms undergo spontaneous emission of radiation at a wavelength within a predefined emission spectrum (typically extending from about 1530 nm to about 1560 nm). This radiation undergoes amplification as it propagates through the Erbium-doped fibre so as to produce amplified spontaneous emission (ASE) radiation. ASE radiation subsequently propagates along the feedback loop 14 through the Fabry-Perot periodic filter 3 which filters the ASE into an optical comb of separate optical channels. One half of the optical power of this comb of channels is removed from the optical loop 14 by the coupler 11 of the output apparatus for output as optical loading channels. The remaining half of the optical power is directed into, and re-amplified by, the second Erbium-doped fibre EDF2 into which has been pumped unused pump radiation by the pump recycling loop 9 of the laser. Traversing the circulator 7 of the recycling unit, the re-amplified remaining ASE enters the AOFS 8 of the laser loop.

Here, the frequency of the re-amplified ASE is shifted by a predetermined amount equal to the drive frequency of the AOFS 8. Typically this amount is of the order of 10 MHz, and the AOFS is configured to provide either a positive shift or a negative shift.

In the AOFS, the re-amplified ASE is caused to interact with a high-frequency (ultrasonic) sound wave inside an optically polished block of crystal. The ASE is oriented with respect to the sound waves so as to reflect off the acoustic wavefronts (via Bragg diffraction). Thus, the action of the AOFS shifts by the predetermined amount the frequency position of the loading channels of optical comb passing through it from the Fabry-Perot optical filter of the loop. These frequency shifted channels are then fed-back into the first Erbium-doped fibre EDF1 by the feedback loop 14 for subsequent amplification, having thus completed one loop of the ring laser cavity.

The frequency shifting produced by the AOFS 8 helps to ensure that the action of the ring laser defined by the feedback loop 14 does not "lock-on" to any one loading channel of the optical comb and progressively amplify and narrow that one channel to the exclusion of all others, as ring lasers are prone to do. The ring laser "sees" a slightly different optical comb after each loop of the ring cavity. Thus, the AOFS 8 helps to maintain an even distribution of intensity across the channels of the optical comb circulating around the fibre loop of the circulating means, each channel experiences approximately the same gain.

Thus, it will be appreciated that, in operation, a portion of the generated ASE is fed back through the ring resonator and the laser is able to oscillate/resonate at its separate ring-resonator modes. The long cavity length of the ring produces a large number of longitudinal modes of fixed spacing (typically a few MHz). The Fabry-Perot periodic filter 3 filters these modes into an optical comb wherein each transmission peak of the filter output i.e. each channel of the comb, contains many (typically hundreds) of such closely-spaced longitudinal modes. The polarisation state of each mode typically changes in response to external stresses, temperature etc. but due to the large number of modes within each single channel, and since there is no correlation between the polarisations of modes within a given channel, the overall polarisation state of the channel is not defined and the channel is de-polarised.

The output power of the loading channels produced by this arrangement is governed by adjusting the pump power and/or the gain-flattening filter 12 of the output apparatus. Laser linewidth may be controlled by suitably adjusting the laser cavity Q-factor and the profile of the Fabry-Perot filter 3.

Figure 2:
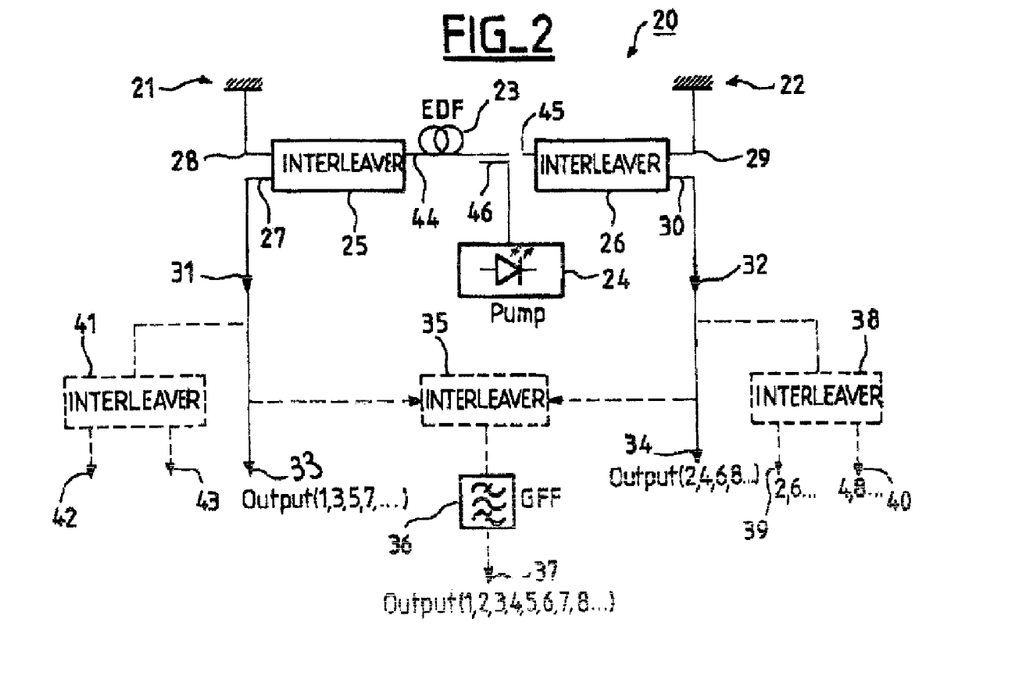
FIG. 2 illustrates a multi-wavelength optical loading-channel source having an optical feedback path comprising two mirrors and two or more interleavers.

FIG. 2 illustrates an alternative embodiment of the present invention in which the periodic optical filter of the loading-channel source 20 is provided by a pair of optical interleavers 25 and 26. In this arrangement, each interleaver provides a spectral slicing of broadband ASE emanating from the doped fibre 23 of the laser, the laser being operated without resonating.

An optical pump 24 provides pump radiation for injection into an Erbium-doped optical fibre 23 via a wavelength-selective optical coupler 46 designed to inject pump radiation into the doped fibre 23 but to not remove amplified radiation therefrom.

Each interleaver of the loading-channel source is an optical device having three optical transmission ports in which, the transmission characteristic between a first and a second of the optical ports has the form of a first series of spaced wavelength channels, and the transmission characteristic between the first and a third of the optical ports has the form of a second series of spaced wavelength channels, and the wavelength positions of the first series interleaves the wavelength positions of the second series. The first series may be transmitted in any direction between the first and second ports of an interleaver, while the second series may be transmitted in any direction between the first and third ports.

In each of the two optical interleavers, 25 and 26, the first of the three optical ports is coupled to the Erbium-doped fibre 23 to receive and send radiation from and to respectively. The second of the three optical ports is coupled to a mirror which reflects back into the optical interleaver, via the second optical port, radiation output from the second port. The third of the three optical ports is coupled to the output apparatus of the loading-channel source 20.

The optical transmission characteristic between the first port 44 and the second port 28 of the first interleaver 25 is the same as the optical transmission characteristic between the first port 45 and the third port 30 of the second interleaver 26. Similarly, the optical transmission characteristic between the first port 44 and the third port 27 of the first interleaver 25 is the same as the optical transmission characteristic between the first port 45 and the second port 29 of the second interleaver 26.

Thus, in operation, amplified spontaneous emissions (ASE) emanating from one end of the pumped Erbium-doped fibre 23 passes into the first port 44 of the first interleaver 25 whereupon it is de-interleaved (split) into two distinct optical combs of loading channels. A first of these two combs may be considered as comprising even-numbered channels de-interleaved from a corresponding second comb of odd-numbered channels. The first comb is directed to the second port 28 of the first interleaver 25 whereupon it is reflected back into the second port of the first interleaver, by the mirror 21 coupled to that port. The second comb is simultaneously directed to the third port 27 of the first interleaver 25 for subsequent output form the loading channel source 20.

The reflected first comb subsequently passes through the Erbium-doped fibre 23 and into the first port 45 of the second interleaver 26 whereupon, due to the transmission characteristic of that interleaver, it is directed to the third port 30 thereof for subsequent output form the loading channel source 20.

Similarly, amplified spontaneous emissions (ASE) emanating from the other end of the pumped Erbium-doped fibre 23 passes into the first port 45 of the second interleaver 26 whereupon it is de-interleaved (split) into two distinct optical combs of loading channels. A first of these two combs may be considered as comprising odd-numbered channels de-interleaved from a corresponding second comb of even-numbered channels. The first comb is directed to the second port 29 of the second interleaver 26 whereupon it is reflected back into the second port of second interleaver, by the mirror 22. The second comb is simultaneously directed to the third port 30 of the second interleaver 26 for subsequent output form the loading channel source 20.

The reflected first comb (from the second interleaver 26) subsequently passes through the Erbium-doped fibre 23 and into the first port 44 of the first interleaver 25 whereupon, due to the transmission characteristic of that interleaver, it is directed to the third port 27 thereof for subsequent output form the loading channel source 20.

Thus, the first and second ports of the two interleavers, 25 and 26, together with the mirrors 21 and 22, the Erbium-doped fibre 23 and the pump source 24, serve as a linear laser cavity for producing two optical combs for output by the loading-channel source.

The output apparatus of the loading channel source includes the third optical ports of each interleaver. It also includes optical isolators 31 and 32 to stop external light from entering the EDFA of the laser and rendering it unstable.

In the present embodiment, each comb is separately output at one of the output ports 33 and 34 respectively. In alternative embodiments, the two optical combs may be recombined by a subsequent interleaver 35 of the output apparatus for output in interleaved combination at output port 37 of the output apparatus. Passing the combined combs through a gain-flattening filter 36 prior to output permits the combined combs to be output with substantially equal loading-channel amplitudes.

Alternatively, each optical comb may be separately further de-interleaved by interleaver 41 (for the odd-numbered channel comb) and 38 (for the even-numbered channel comb). Thus, sub-combs 39, 40, 42 and 43 may be produced. Additional interleavers may be cascaded to further split (or to combine) numbers of those sub-combs.

The optical loading-channel source 20 is kept below its lasing threshold in operation so as to provide a flat and stable output spectrum (combs) of loading-channels that can be tailored by a gain-flattening filter such as filter 36. The channel spacing and linewidths thereof are controlled by the type of interleaver used and the interleaver cascading arrangement used in the output apparatus of the loading-channel source.

Figure 3:
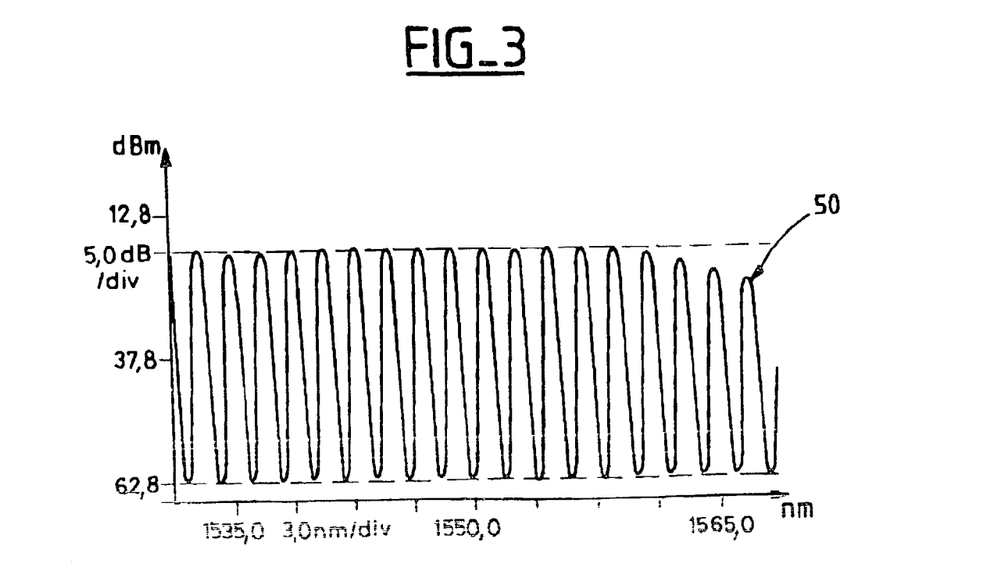
FIG. 3 an example of an optical comb output signal comprising a comb of optical loading channels produced by the arrangement of FIG. 2.

FIG. 3 illustrates an example of an optical comb 50 of loading channels produced by the arrangement of FIG. 2.

Figure 4:
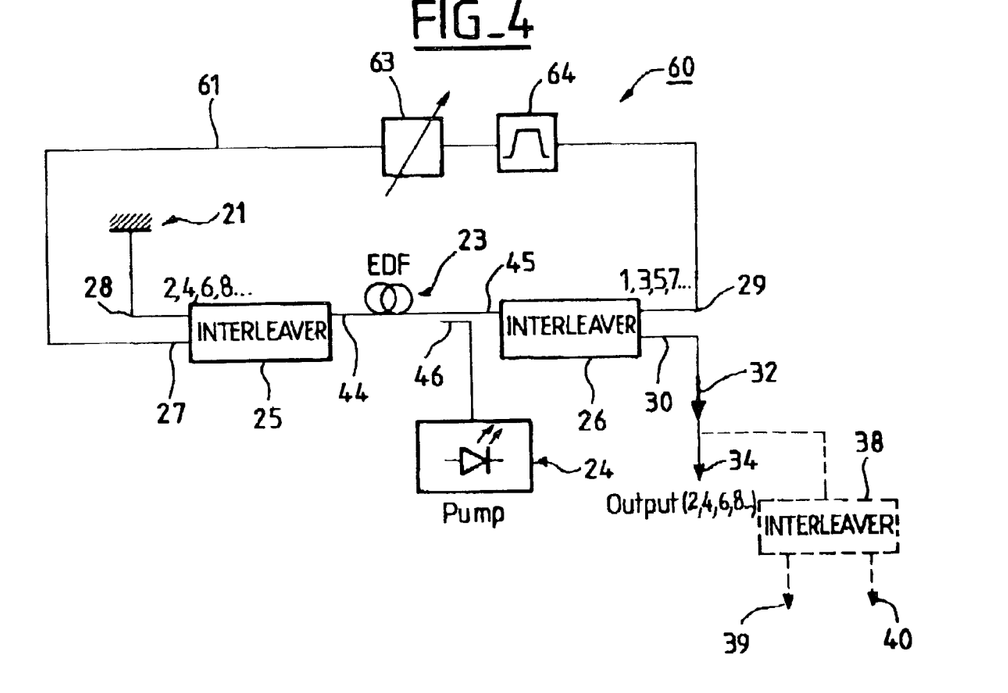
FIG. 4 illustrates a multi-wavelength optical loading channel source having two optical interleavers, an optical feedback path employing a feedback loop, and an optical feedback path employing a feedback mirror.

FIG. 4 illustrates a third embodiment of an optical loading-channel source 60 according to the present invention. The arrangement is similar to that illustrated in FIG. 2 and like components have been given like reference numerals. An optical feedback loop 61 is employed to provide a ring-type laser resonator feedback loop for the odd-numbered channel combs produced by the interleavers 25 and 26 in place of the linear resonator feedback path employed in the arrangement of FIG. 2.

The ring feedback loop 61 couples the third port 28 of the first interleaver 25 to the second port 29 of the second interleaver 26. A variable optical attenuator 63 and a band-pass filter 64 are located within the feedback loop 61 between the ports 28 and 29 of the two connected interleavers. The band-pass filter 64 has wavelength narrow pass-band centred on 1558 nm which ensures that all but radiation at and around this wavelength are removed from the feedback loop. The ring laser is made stable in this way. In operation, adjustment of the variable attenuator 63 and the power output of the pump source 24 controls the output power spectrum flatness of the loading-channel optical comb.

In a similar way, a second optical feedback loop could be employed in the place of mirror 21, and connecting the second port 28 of the first interleaver 25 to the third port 30 of the second interleaver 26. Though not illustrated in FIG. 4, this would provide a ring resonator loop for the even-numbered comb channels of the loading-channel source 60. Optical coupling means could be used with this second feedback loop for the purposes of extracting even-numbered comb radiation from the loop.

Figure 5:
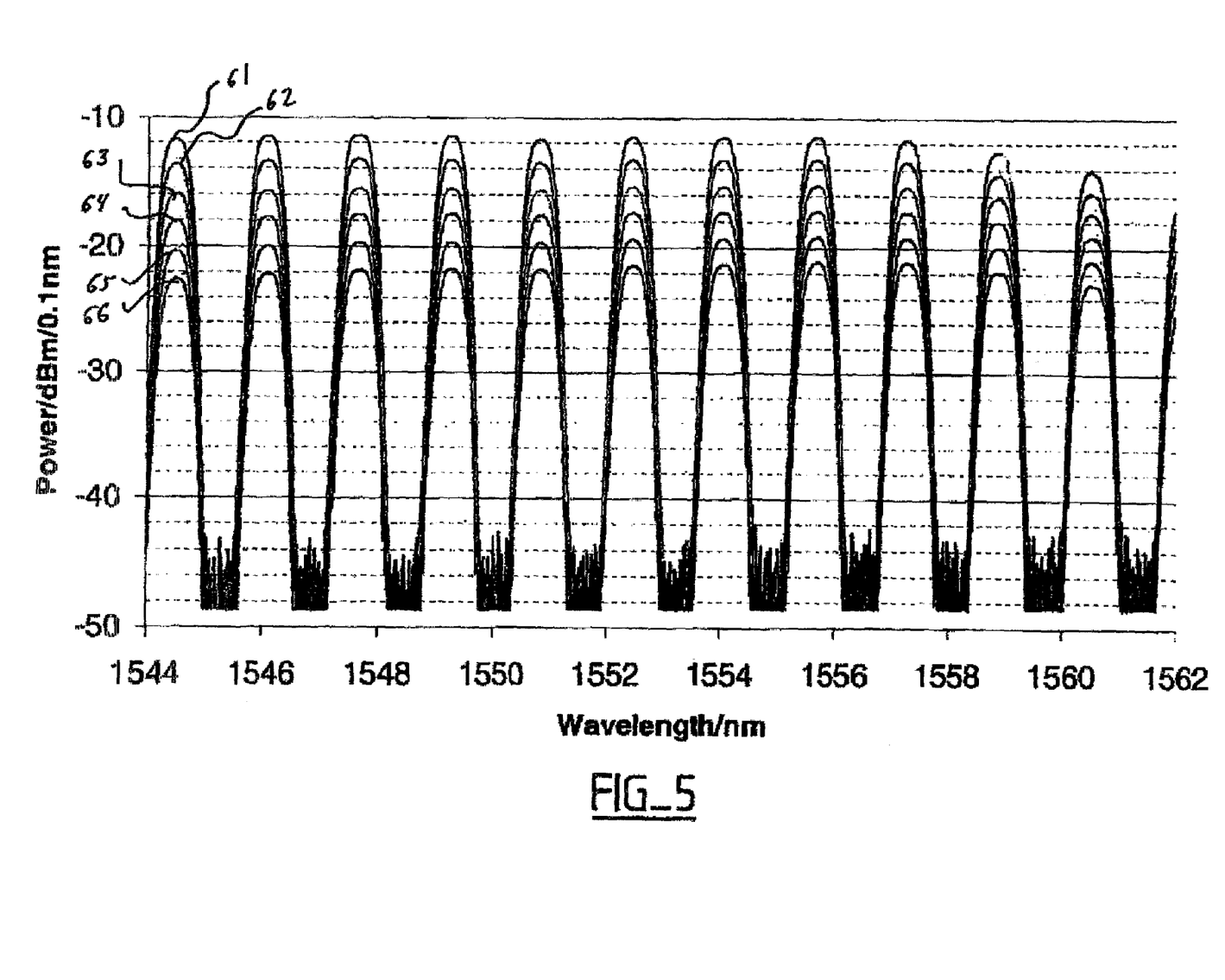
FIG. 5 illustrates examples of optical signals output from the arrangement of FIG. 4.

Referring to FIG. 5 there are shown six different superimposed spectral plots, 61 to 66, of loading channel combs as typically output at the output 43 of the optical loading-channel source 60 of FIG. 4 in which the laser resonates at radiation frequencies other than those of the loading channels.

In each one of the six loading channel combs 61 to 66, FIG. 5 illustrates the optical output power of the respective comb as a function of wavelength across eleven consecutive loading channels. As can be seen, the amplitudes of the eleven channels of a given comb are approximately equal in magnitude, with the amplitudes of comb 61 being of the largest magnitude and successively numbered combs showing successively smaller channel amplitudes up to comb 66 which shows the smallest channel amplitudes of the six combs.

The six different combs were obtained by an appropriate manipulation of the power level of the optical pump radiation input to the Erbium-doped amplifying medium 23 by the pump radiation source 24, in conjunction with a manipulation of the degree of optical attenuation imparted by the variable optical attenuator 63 upon radiation circulating within the optical feedback loop 61.

In particular, while both the pump power radiation level of the pump source 24 and the attenuation level of the variable attenuator 63 influence both the optical comb power output level and the flatness of that output comb, it is predominantly the optical pump power level which determines the optical comb output power and predominantly the attenuation level of the variable attenuator 63 which determines the flatness of the optical comb.

For example, to reduce the power level of an optical comb output from a loading channel source in use, one may reduce the power level of the pump radiation source 24 and thereby reduce the degree of population inversion within the Erbium-doped amplifying medium 23. The consequence is reduced amplification of optical comb radiation passing through the medium 23 and a resultant reduction in the channel amplitudes of the output optical comb.

It has been found that reducing the pump power level in this way also induces a tilt in the channel amplitudes of the optical comb whereby the amplitudes of channels at shorter wavelengths fall relatively more than those of channels at longer wavelengths. To counter this, an increase in the level of attenuation by the optical attenuator 63 causes greater attenuation of radiation circulating therein, reduces lasing and has been found to cause the tilt in the optical comb to flatten.

Thus, it is preferable that a decrease/increase in the pump power level in the feedback loop 61 should be accompanied by a reciprocal increase/decrease in the attenuation level within the feedback loop in order to ensure that the resulting decrease/increase in the loading channel amplitudes is relatively uniform and the comb is maintained relatively flat.

It will be appreciated that modifications and variations, as would be readily apparent to the skilled person, may be made to the embodiments described above without departing from the scope of the present invention.

The invention claimed is:

1. A wavelength division multiplexing optical transmission system comprising:
   an optical loading-channel transmitter generating a plurality of un-modulated optical loading channels,
   wherein the optical loading channel transmitter comprises a doped-fiber laser comprising a resonator constructed as an optical loop comprising:
      at least one rare-earth-doped optical fiber,
      a periodic optical filtering apparatus for generating an optical comb comprising a plurality of separate optical loading channels from amplified optical radiation produced by the optical fiber laser, and
      an output apparatus for outputting from the optical loading-channel transmitter a plurality of the optical loading channels of the generated optical comb, and
   wherein the wavelength division multiplexing optical transmission system further comprises a pump re-cycling apparatus removing and inserting pump radiation into the resonator optical loop, and
   wherein the pump re-cycling apparatus has an optical transmission line with a first end coupled to said resonator optical loop for removing said pump radiation therefrom and a second end coupled to said resonator optical loop for inputting said removed pump radiation thereto, and wherein a rare-earth-doped optical fiber is located within said resonator optical loop for receiving removed said pump radiation input thereto by said second end of the transmission line of said re-cycling apparatus.

2. A wavelength division multiplexing optical transmission system according to claim 1, wherein the doped-fiber laser comprises a frequency shifting apparatus operable to shift by a predetermined amount frequency position of the optical channels of the optical comb, which pass through the frequency shifting apparatus; such that amplified optical radiation output from said at least one rare-earth-doped optical fiber passes through said periodic optical filtering apparatus and said frequency shifting apparatus before being directed back into said at least one rare-earth-doped optical fiber.

3. A wavelength division multiplexing optical transmission system according to claim 1, wherein said first end of the optical transmission line of said pump re-cycling apparatus is coupled to the optical loop of said resonator via a wavelength-selective optical coupler which removes pump radiation from the resonator but does not remove amplified radiation therefrom.

4. A wavelength division multiplexing optical transmission system according to claim 1, wherein, said second end of the re-cycling apparatus is coupled to said resonator optical loop via an optical circulator located within said resonator optical loop, the optical circulator being configured to direct removed pump radiation from said optical transmission line into said other rare-earth-doped fiber, and to direct amplified optical radiation from said other rare-earth-doped fiber into said frequency-shifting apparatus.

5. The transmission system according to claim 1, wherein the plurality of optical loading channels are redundant non-data channels.

6. A multi-channel optical loading-channel transmitter having a doped-fiber laser comprising:
a resonator constructed as an optical loop comprising: at least one rare-earth-doped optical fiber and a periodic optical filtering apparatus for generating an optical comb comprising a plurality of separate optical loading channels from amplified optical radiation produced by the optical fiber laser,
an output apparatus for outputting from the optical loading-channel transmitter a plurality of the optical loading channels being at least some of said optical channels of the generated optical comb; and
a pump re-cycling apparatus removing and inserting pump radiation into the resonator optical loop,
wherein the pump re-cycling apparatus has an optical transmission line with a first end coupled to said resonator optical loop for removing said pump radiation therefrom and a second end coupled to said resonator optical loop for inputting said removed pump radiation thereto, and wherein a rare-earth-doped optical fiber is located within said resonator optical loop for receiving removed said pump radiation input thereto by said second end of the transmission line of said re-cycling apparatus.

7. The multi-channel optical loading-channel transmitter according to claim 6, wherein the plurality of optical loading channels are redundant non-data channels.

8. A WDM optical transmitter comprising: a broad-band optical source having a broad spectral bandwidth,
wherein the broad-band optical source comprises a doped fiber laser constructed as an optical loop including: at least one rare-earth-doped optical fiber and a periodic optical filtering apparatus for generating an optical comb comprising a plurality of separate optical loading channels from amplified optical radiation produced by the optical fiber laser, and output apparatus for outputting from the optical loading-channel transmitter a plurality of the optical loading channels being at least some of said optical channels of the generated optical comb, and
wherein the optical loading-channel transmitter comprises a pump re-cycling apparatus removing and inserting pump radiation into the optical loop, and
wherein the pump re-cycling apparatus comprises: an optical transmission line having a first end coupled to said optical loop for removing pump radiation therefrom and a second end coupled to said optical loop for inputting removed pump radiation thereto, and wherein the rare-earth-doped optical fiber located within sad optical loop receives removed pump radiation input thereto by said second end of the transmission line of said re-cycling apparatus.

9. A WDM optical transmitter according to claim 8 comprising:
a frequency shifting apparatus operable to shift by a predetermined amount the frequency position of the channels of optical combs which pass through the frequency shifting apparatus; such that amplified optical radiation output from said at least one rare-earth-doped optical fiber passes through said periodic optical filtering apparatus and said frequency shifting apparatus before being directed back into said at least one rare-earth-doped optical fiber.

10. A WDM optical transmitter according to claim 8, wherein said first end of the optical transmission line of said pump re-cycling apparatus is coupled to the optical loop of said resonator via a wavelength-selective optical coupler which removes pump radiation from the resonator but does not remove amplified radiation therefrom.

11. The WDM optical transmitter according to claim 8, wherein the plurality of optical loading channels are redundant non-data channels.

12. A method of optically loading an optical transmission line with multiple optical loading channels comprising:
generating laser radiation with a doped-fiber laser,
generating an optical comb comprising a plurality of separate optical loading channels from amplified optical radiation produced by a periodic optical filtering apparatus of the optical fiber laser,
outputting a plurality of the optical loading channels without any data modulation into the optical transmission line carrying modulated optical data channels, and
removing and inserting the radiation into a resonator optical loop of the doped-fiber laser,
wherein the radiation is removed and inserted via an optical transmission line, which has a first end coupled to said optical loop for removing pump radiation therefrom and a second end coupled to said optical loop for inputting removed pump radiation thereto, and
wherein a rare-earth-doped optical fiber located within said optical loop receives removed pump radiation input thereto by said second end of the transmission line of said re-cycling apparatus.

13. The method according to claim 12, wherein the plurality of optical loading channels are redundant non-data channels.

* * * * *